(12) United States Patent
Yip

(10) Patent No.: US 8,106,363 B2
(45) Date of Patent: Jan. 31, 2012

(54) DIGITAL RADIOGRAPHY PANEL WITH PRESSURE-SENSITIVE ADHESIVE FOR OPTICAL COUPLING BETWEEN SCINTILLATOR SCREEN AND DETECTOR AND METHOD OF MANUFACTURE

(75) Inventor: Kwok L. Yip, Webster, NY (US)

(73) Assignee: Carestream Health, Inc., Rochester, NY (US)

( * ) Notice: Subject to any disclaimer, the term of this patent is extended or adjusted under 35 U.S.C. 154(b) by 296 days.

(21) Appl. No.: 12/104,780

(22) Filed: Apr. 17, 2008

(65) Prior Publication Data

US 2009/0261259 A1  Oct. 22, 2009

(51) Int. Cl.
*G01T 1/20* (2006.01)

(52) U.S. Cl. ............... 250/370.09; 250/370.11

(58) Field of Classification Search .......... 250/370.09, 250/370.11
See application file for complete search history.

(56) References Cited

U.S. PATENT DOCUMENTS

| | | | |
|---|---|---|---|
| 4,311,907 A * | 1/1982 | Takami et al. ............ 250/368 |
| 4,532,425 A * | 7/1985 | Abileah et al. ............ 250/363.02 |
| 4,720,426 A * | 1/1988 | Englert et al. ............ 428/344 |
| 4,845,731 A * | 7/1989 | Vidmar et al. ............ 378/98 |
| 5,506,409 A * | 4/1996 | Yoshida et al. ............ 250/368 |
| 5,533,256 A * | 7/1996 | Call et al. ............ 29/840 |
| 6,031,234 A * | 2/2000 | Albagli et al. ............ 250/370.11 |
| 6,663,978 B1 | 12/2003 | Olson et al. |
| 7,326,588 B2 * | 2/2008 | Yaung et al. ............ 438/57 |
| 7,605,374 B2 * | 10/2009 | Hoggatt et al. ............ 250/368 |
| 2002/0092992 A1 * | 7/2002 | Izumi ............ 250/370.12 |
| 2002/0121606 A1 * | 9/2002 | Okada et al. ............ 250/370.11 |
| 2004/0219289 A1 * | 11/2004 | Lamotte et al. ............ 427/69 |
| 2005/0035298 A1 * | 2/2005 | Okada et al. ............ 250/370.11 |
| 2005/0156113 A1 * | 7/2005 | Suzuki et al. ............ 250/368 |
| 2006/0033054 A1 * | 2/2006 | Yamada ............ 250/504 R |
| 2006/0131503 A1 * | 6/2006 | Freund et al. ............ 250/361 R |
| 2007/0181252 A1 * | 8/2007 | Bohm et al. ............ 156/297 |
| 2009/0072150 A1 * | 3/2009 | Trissel ............ 250/363.01 |
| 2009/0101844 A1 * | 4/2009 | Ohbayashi ............ 250/488.1 |
| 2009/0140153 A1 * | 6/2009 | Flamanc et al. ............ 250/368 |

FOREIGN PATENT DOCUMENTS

EP  1 024 374  8/2000

* cited by examiner

*Primary Examiner* — David Porta
*Assistant Examiner* — Djura Malevic

(57) ABSTRACT

A digital radiography panel has a scintillator screen having a light-exiting surface from a material with a first index of refraction $n_1$ and a photosensor array having a light-accepting surface from a material with a second index of refraction $n_2$. A pressure-sensitive adhesive couples the light-exiting surface of the scintillator screen to the light-accepting surface of the photosensor array and has a third index of refraction that has a value $n_{PSA}$ that either lies in the range between $n_1$ and $n_2$, or substantially matches $n_1$ or $n_2$, or both.

22 Claims, 9 Drawing Sheets

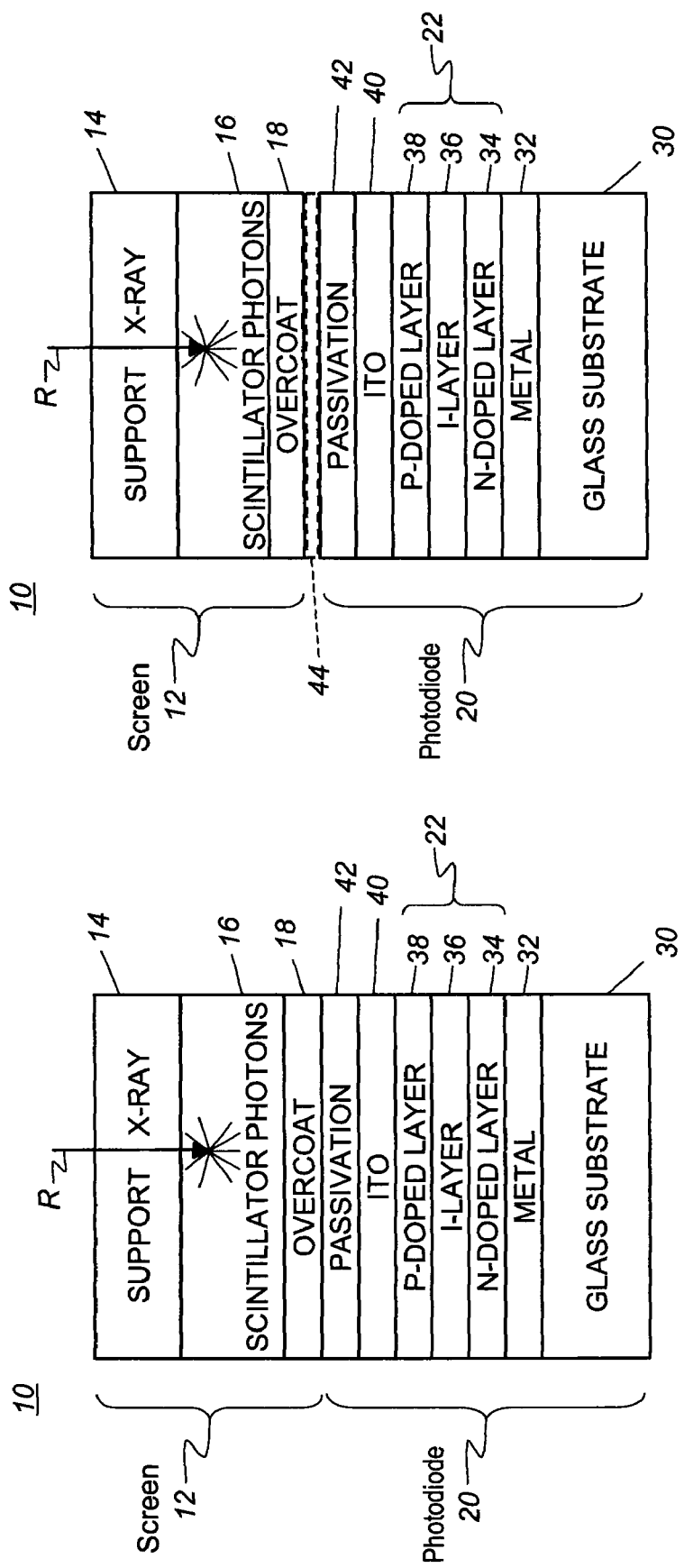

DIGITAL RADIOGRAPHY PANEL WITH PRESSURE-SENSITIVE ADHESIVE FOR OPTICAL COUPLING BETWEEN SCINTILLATOR SCREEN AND DETECTOR AND METHOD OF MANUFACTURE

FIELD OF THE INVENTION

This invention generally relates to digital radiography (DR) systems hardware and more particularly relates to indirect DR apparatus having improved optical coupling between scintillator and light detector components.

BACKGROUND OF THE INVENTION

Digital radiography is increasingly accepted as an alternative to film-based imaging technologies that rely on photosensitive film layers to capture radiation exposure and thus to produce and store an image of a subject's internal physical features. With digital radiography, the radiation image exposures captured on radiation-sensitive layers are converted, pixel by pixel, to electronic image data which is then stored in memory circuitry for subsequent read-out and display on suitable electronic image display devices.

The perspective view of FIG. 1 shows a partial cutaway view of a small edge portion of an indirect DR panel 10. A scintillator screen 12 responds to incident x-ray radiation by generating visible light that is, in turn, detected by a flat panel detector (FPD) 20. Detector 20 has a two-dimensional array having many thousands of radiation sensitive pixels 24 that are arranged in a matrix of rows and columns and are connected to readout element 25. As shown at enlarged section E, each pixel 24 has one or more photosensors 22, such as a PIN diode or other light-sensitive component, and an associated switch element 26 of some type, such as one or more thin film transistors, or TFTs. To read out image information from the panel, each row of pixels 24 is selected sequentially and the corresponding pixel on each column is connected in its turn to a charge amplifier (not shown). The outputs of the charge amplifiers from each column are then applied to other circuitry that generates digitized image data that then can be stored and suitably image-processed as needed for subsequent storage and display.

Indirect DR imaging shows promise for providing improved diagnostic imaging performance with high levels of image quality. However, some drawbacks remain. Because scintillator materials respond to incident x-ray radiation by emitting light over a broad range of angles, there is some inherent amount of scattering in the indirect detection process. This reduces the optical efficiency of image formation due to loss of light, signal crosstalk, and related effects, and tends to degrade image quality.

For a better understanding of the optical coupling problem, it is helpful to consider components of DR panel 10 more closely and with particular attention to how light emitted at larger angles is handled. FIG. 2A shows a cross-sectional view of component layers of DR panel 10 having conventional fabrication. Scintillator screen 12 has a scintillator layer 16 formed on a support 14 that is highly transmissive to incident x-ray radiation. A protective overcoat layer 18 may be provided for scintillator layer 16. Detector 20 may comprise a PIN diode as photosensor 22, with a p-doped layer 38, an I-layer (intrinsic or undoped layer) 36, and an n-doped layer 34 formed on a metal layer 32 which is itself supported by a substrate 30, typically of glass. A transparent ITO (Indium-Tin Oxide) layer 40 provides conductive traces. A passivation layer 42 then adds insulation and surface uniformity.

Scintillator layer 16 material responds to incident x-ray R by emitting photons toward photosensor 22, but over a broad range of angles, including angles at which the emitted light is effectively wasted due to total internal reflection (TIR) effects within the scintillator layer 16 or, if provided, overcoat layer 18. Using the model arrangement of FIG. 2A, as long as there is good optical coupling between scintillator screen 12 and detector 20, a sufficient amount of the emitted signal is directed toward photosensor 22. In FIG. 2A, overcoat layer 18 is illustrated to be in theoretical total contact with passivation layer 42, providing optimal coupling.

In practice, however, there is often poor optical coupling between scintillator screen 12 and detector 20. FIG. 2B shows an air gap 44 (dotted outline) between layer 18 of scintillator screen 12 and layer 42 of detector 20. For light at very small angles of incidence (relative to normal) with respect to passivation layer 42, the net effect of air gap 44 can be negligible. But for light at larger angles, air gap 44 causes a problem. When light is incident from a dense medium with a higher index of refraction n to a rare medium with a lower index of refraction n' (e.g., n'=1.0 for air), total internal reflection may occur at the interface of the two media depending on the angle of incidence. With respect to FIG. 2B, TIR occurs at the interface between layer 18 and air gap 44, for incident light at or exceeding a critical angle $\theta_c$ defined by:

$$\theta_c = \sin^{-1}\left(\frac{1}{n}\right)$$

For an overcoat layer of polymethyl methacrylate or PMMA, for example (with n=1.47), critical angle $\theta_c$ is approximately 43 degrees. This means that light at any angle greater than this value is reflected at the interface, rather than directed to photosensor 22. Some portion of this light is generally lost; another portion would be redirected to the wrong photosensor element as crosstalk. The net effects include lost efficiency and reduced spatial resolution (generally measured by the modulation transfer function, MTF).

Improved optical coupling between the scintillator screen and the detector would help to boost efficiency and improve overall image quality accordingly. Generally, solutions that have been proposed for doing this have shown only limited success. Moreover, although some of the proposed solutions may indeed improve optical coupling, they achieve this at the cost of increased complexity and higher expense or inadvertently introduce other problems.

Among methods employed for improving optical coupling between the scintillator screen and the detector are the following, represented schematically in FIGS. 3A through 3F:

(i) Applying continuous pressure between the scintillator screen and the flat panel detector, thereby maintaining physical contact between these assemblies. This type of solution, shown by arrows in FIG. 3A, is defeated by the dimensional requirements of the DR panel. A typical indirect DR detector may be as large as 17×17 inches (289 square inches). It is difficult to maintain optical contact between a scintillator screen and a photodiode array throughout the whole detector area at this scale. Uniformity of optical contact is a must. Where an air gap occurs, the light transmission and the spatial resolution (MTF) would be significantly degraded.

(ii) Depositing a scintillator layer directly onto the photodiode array. FIG. 3B shows a deposition apparatus 50 for forming scintillator layer 12. This method assures physical contact, hence optical contact. However, this type of processing can be complex, may risk damage to the photodiode array and can be very expensive. Flat panel detector 20 is an expensive device and can cost many thousands of dollars, making it impractical to use as a "substrate" for deposition or coating of materials. Uniformity of deposition also presents an obstacle that makes this type of solution less than desirable.

(iii) Use of a fiber-optic plate (FOP) 52 between detector 20 and scintillator screen 12, as shown in FIG. 3C. FOP 52 is an optical device consisting of several millions of glass fibers 54, each a few micrometers in diameter, bonded in parallel to one other. Light from the radiation image is transmitted from the scintillator to the photodiode array through each fiber. A typical FOP is about 3 mm thick and the diameter of fibers 54 is about 6 um. Scintillator screen 12 is disposed on FOP 52, then this combination is pressed against detector 20. Air gaps 44 still may be present on either side of FOP 52. Although the FOP provides high-resolution imaging, it suffers a considerable light loss (about 37%). FOP transmittance is about 63% for Lambertian light at the wavelength of 0.55 um. In addition, air gaps 44 can still occur on either surface of FOP 52. This solution, therefore, also encounters the problems described in (i) and shown in FIG. 3A.

(iv) Depositing a scintillator layer directly onto the fiber-optic faceplate. FIG. 3D shows this hybrid solution. This solution reduces or eliminates air gaps 44 between scintillator screen 12 and FOP 52; however, there can still be an air gap problem at the other surface of FOP 52. This solution also suffers from low transmittance as at (iii).

(v) As in FIG. 3E, depositing a scintillator layer directly onto the fiber-optic faceplate as in (iv) and applying an optical adhesive 56 between the coated FOP 52 and detector 20. As with methods (iii) and (iv) just given, this method suffers from the inherently low transmittance of the fiber-optic faceplate.

(vi) As in FIG. 3F, insertion of a conventional optically transparent polymer layer 58 between scintillator screen 12 and detector 20. The optical polymer materials used for this purpose may be in the form of fluid, gel, thermoplastic material, or glue. Each of these optical polymers has accompanying problems. Optical fluids are the most convenient to apply. However, as true fluids, they require containment or will otherwise tend to flow out from the optical interface if unsealed. Optical gels are non-migrating and do not require containment seals. However, they are too soft to provide dimensional rigidity, and may swell with prolonged exposure or at elevated temperatures. Optical thermoplastics (such as elastomers and resins) include soft plastics that, when cured, provide some dimensional rigidity. However, an additional thermal or radiation process for curing is generally required; such processing can be risky for electronic components of detector 20. Optical glues exhibit similar problems as optical gels. It is also difficult to apply a uniform thickness of glue between the scintillator screen and the detector array. One solution for this problem, proposed in U.S. Pat. No. 5,506,409 to Yoshida et al. entitled "Radiation Detecting Device and the Manufacture Thereof", is the use of spherical spacers to ensure the proper adhesive thickness. However, this requires a number of added steps for proper adhesion, with some complexity and risk of irregular spacer distribution.

Further difficulties occur in attempting to deposit a columnar scintillator such as CsI directly onto the photodiode array or the fiber-optic faceplate, as noted in (ii), (iv), and (v) above. A structureless layer (or seed layer) of finite thickness is first formed before a layer of CsI with columnar structure is formed. This structureless layer would tend to provide significant scattering of light before reaching the photodiode array or the fiber-optic faceplate and degrade the spatial resolution (MTF). Alternatively, a columnar scintillator is first directly deposited onto a substrate so that the structureless seed layer is formed between the substrate and the columnar layer, thus minimizing the light scattering effect. The resulting scintillator screen is then pressed against the photodiode array or the fiber-optic faceplate. However, as discussed in solution (i) above, an air gap would be very likely if optical contact is not maintained across the detector surface. This problem would be particularly acute with a large DR detector.

Still other approaches for boosting the light efficiency of DR panels focus more directly on scintillator materials design. For example, European Patent Application EP 1 024 374 entitled "Scintillator Panel and Radiation Image Sensor" by Homme et al. describes an improved substrate selection for the scintillator screen, with deposition of columnar CsI (cesium iodide) crystals on the substrate. The scintillator screen is then stuck in some manner against the detector array panel for imaging. As with the approaches listed in (i) to (iv) above, the solution offered by Homme et al. does not alleviate the problems caused by air gaps at the interface. Moreover, this solution does not indicate whether or not adhesives are used. Some types of adhesives, such as epoxies and others, contain compounds that are harmful to CsI crystal material.

As DR technology advances, new materials and fabrication techniques are being developed to lower the cost and improve the performance of the DR panel. One upcoming development that has particular value relates to fabrication of detector and scintillator layers on substrates that are increasingly more flexible. While this offers significant advantages for diagnostic imaging, such as in dental imaging, for example, the use of flexible substrates also presents considerable challenges. One of these challenges is in maintaining good optical coupling between the scintillator and detector components. Conventional techniques, as described earlier in (i)-(vi) and with reference to FIGS. 3A-3F, do not appear well-suited to meeting this challenge.

Thus, it can be seen that, while there have been a number of attempts to improve DR panel efficiency, there is still room for improvement. Solutions that reduce or eliminate TIR at the scintillator/detector interface without an elaborate number of steps and using materials appropriate for the scintillator or detector components would be particularly helpful. Moreover, solutions that are adaptable for future, more flexible substrates are needed.

SUMMARY OF THE INVENTION

It is an object of the present invention to address the need for a digital radiography panel with improved optical coupling. With this need in mind, the present invention provides a digital radiography panel comprising: a scintillator screen having a light-exiting surface from a material with a first index of refraction $n_1$; a photosensor array having a light-accepting surface from a material with a second index of refraction $n_2$; and a pressure-sensitive adhesive bonding the light-exiting layer of the scintillator screen to the light-accepting layer of the photosensor array and having a third index of refraction that has a value $n_{PSA}$ that either lies in the range between $n_1$ and $n_2$, or substantially matches $n_1$ or $n_2$, or both.

A feature of the present invention is that it provides a DR panel with scintillator and detector components bonded by means of a pressure-sensitive adhesive.

An advantage of the present invention is that it provides a method for optical coupling that enhances DR panel efficiency and resolution and is compatible with a range of materials.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings.

FIG. 2A is a cross-sectional view showing components of a conventional DR panel.

FIG. 2B is a cross-sectional view similar to that of FIG. 2A, showing an air gap formed between the photosensor array and scintillator screen.

DETAILED DESCRIPTION OF THE INVENTION

Figures shown and described herein are provided to illustrate principles of operation of embodiments of the present invention and are not drawn with intent to show actual size or scale. Some omission of conventional parts and exaggeration of detail have been used in order to emphasize important structural and positional relationships and principles of operation.

As described earlier in the background section, optical adhesives have been proposed and utilized for maintaining contact between the scintillator screen and the detector array in a number of DR panel designs. However, due to problems in achieving uniform coverage, chemical incompatibility, curing requirements, and other difficulties, results with conventional types of optical adhesives have been disappointing.

Pressure-Sensitive Adhesives, PSAs, are a distinct category of adhesives and have some properties not common to other types of bonding materials. PSAs are aggressively tacky in dry form (solvent-free) at room temperature and firmly adhere to a variety of dissimilar surfaces upon application. PSA materials require only light finger pressure for adhesion; no other activation or curing is needed in order to bond the PSA to a compatible surface. Some PSAs have sufficient strength to be removed by peeling without leaving adhesive residue. A number of PSAs also provide the benefit of low emission of harmful gaseous species, unlike some other adhesives, such as epoxy resins. This type of undesirable gas emission could cause damage to contact surfaces or to components nearby.

While PSAs have advantages in some applications, they have not been utilized in DR panel applications for a number of reasons. Conventional DR panel designs utilize rigid substrate materials for which PSAs may appear to offer little or no advantage over adhesives that cure in a hardened state. Improper selection and application of PSA materials can result in non-uniform bonding and air bubbles. Not all PSAs have optical qualities that are suited to the requirements of the DR application. Moreover, poor choice of transparent PSAs can yield disappointing efficiency levels when compared with other conventional solutions.

The present invention provides a DR panel wherein the scintillator screen and detector components are bonded together using an index-matching PSA layer. Referring to the cross-sectional view of FIG. 4, a DR panel 60 has a pressure-sensitive adhesive (PSA) layer 62 providing optical coupling between scintillator screen 12 and flat panel detector 20.

Figures 5A, 5B:
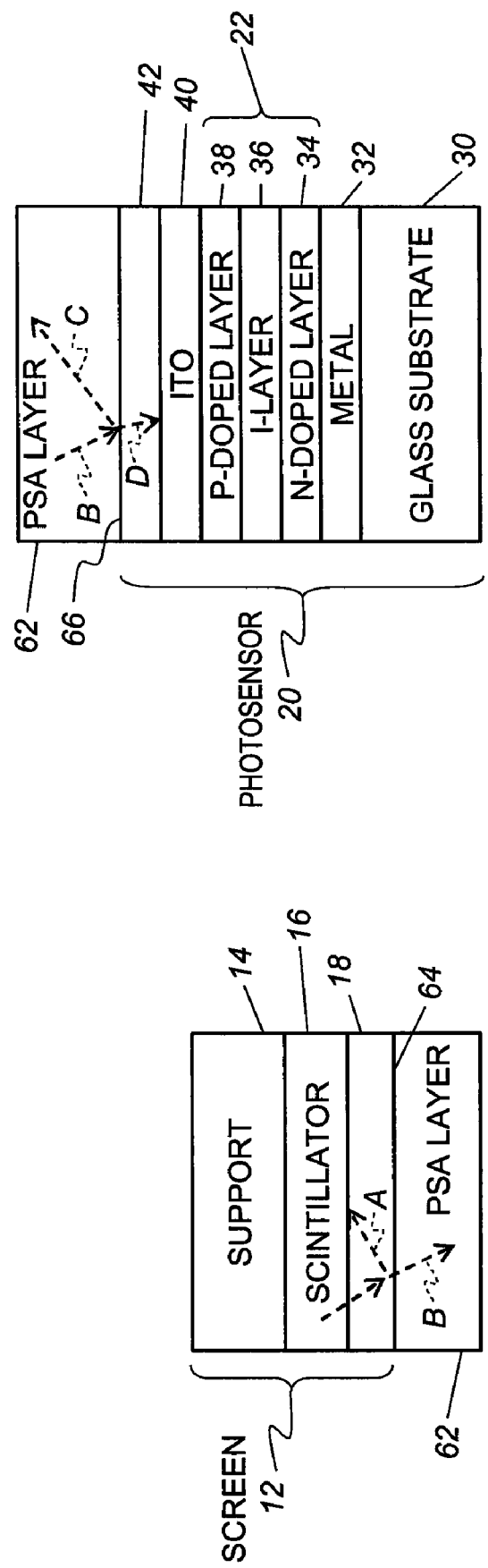
FIG. 5A shows the interface between the scintillator screen and pressure-sensitive adhesive layer.
FIG. 5B shows the interface between the detector and pressure-sensitive adhesive layer.

In order to provide optical coupling with improved optical efficiency, it is desirable to eliminate or at least significantly decrease the amount of internal reflection that occurs at the interface between scintillator screen 12 and PSA layer 62. Referring to FIG. 5A, PSA layer 62 bonds to scintillator screen 12 at a light-exiting surface 64; in this embodiment, light-exiting surface 64 is the outer surface of light-exiting overcoat layer 18. Unwanted reflection is shown by the dashed arrow A. It can be appreciated that this stray light is either lost or, if it reaches detector 20 at a nearby pixel, contributes to cross-talk. As long as the index of refraction n1 of overcoat layer 18 is equal to or less than the index of refraction $n_{PSA}$ of PSA layer 62, there is no loss of light due to internal reflection; only refraction occurs, as shown by the dashed arrowed line labeled B in FIG. 5A. Where PSA layer 62 is perfectly index-matched to overcoat 18, there is no reflection or refraction and the light travels straight through the PSA layer.

In practice, it can be very difficult to obtain the exact same index of refraction from two different materials, even where formulation adjustments are possible. To "substantially match" a refractive index, as the phrase is used in the context of the present disclosure, means that two indices differ from each other by no more than about 0.12, more preferably by no more than about 0.08 and most preferably by no more than about 0.04. With a difference in indices of about 0.12, optical coupling efficiency is reduced by about 15% or less. With a difference of about 0.08, optical coupling efficiency is reduced by about 10% or less. With a difference of about 0.04, optical coupling efficiency is reduced by about 5% or less.

The cross-section view of FIG. 5B shows the other interface that must be considered for index-matching. Detector 20 has a light-accepting surface 66, shown as the surface of light-accepting passivation layer 42 in the particular embodiment of FIG. 5B. At this interface, unwanted reflection is shown by the dashed arrow C. As long as the index of refraction $n_{PSA}$ of PSA layer 62 is equal to or less than the index of refraction n2 of passivation layer 42, there is no loss of light due to internal reflection; only refraction occurs, as shown by the dashed arrowed line labeled D in FIG. 5B. Where PSA layer 62 is perfectly index-matched to passivation layer 42, there is no reflection or refraction and the light transmits through the passivation layer.

Coupling in the Optical Path

From the description of the two interfaces for PSA layer 62 as described with reference to FIGS. 5A and 5B, it can be seen that the refractive index of the PSA layer, $n_{PSA}$, must be selected with care. The following description gives an analysis of the interface problem and some of its key metrics.

The coupling (transfer) of optical photons from the scintillator screen to the a-Si photodiode array involves the following processes:

Interaction of incident x-ray quanta in the scintillator layer resulting in an isotropic emission of light photons;

Absorption of photons by the layers overlying the photodiodes or other photosensor;

Reflection and total internal reflection losses at each interface between two adjacent layers overlying the photodiodes; and Absorption of photons by the intrinsic layer of the photodiodes.

The optical coupling efficiency from the scintillator to the photodiode depends on the wavelength (λ) of light and is given by the following:

$$\eta_{coupling}(\lambda) = \left[ \prod_j (1 - A_j(\lambda)) \prod_k (1 - R_{TIR,k}(\lambda))(1 - R_{Fresnel,k}(\lambda)) \right] \cdot A_{pd}(\lambda) \quad (1)$$

Figure 1:
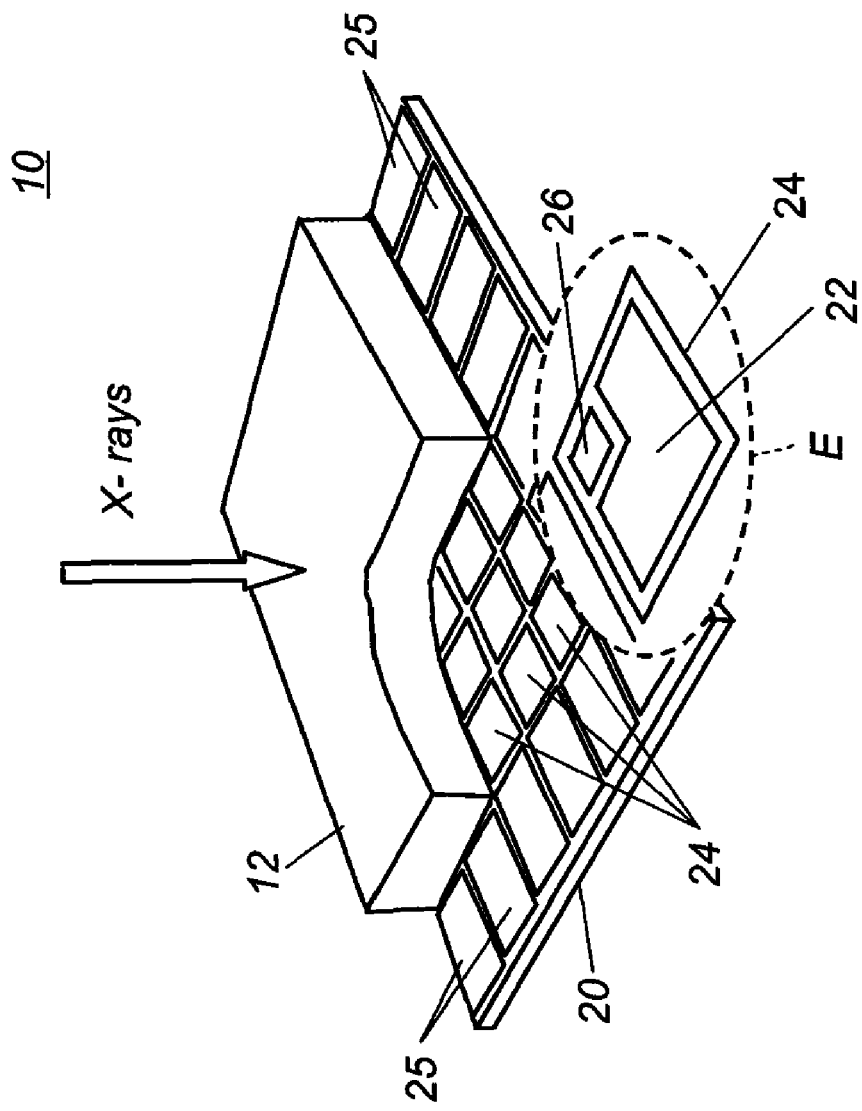
FIG. 1 is a perspective, partial cutaway view showing a small portion of a DR panel.
Figure 3C:
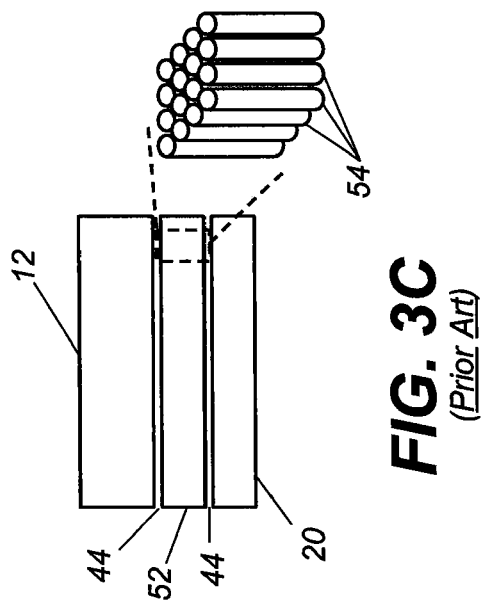
FIGS. 3A, 3B, 3C, 3D, 3E, and 3F are cross-sectional views that illustrate various methods that have been used to improve optical coupling between the scintillator screen and detector array in conventional DR panel designs.
Figure 3B:
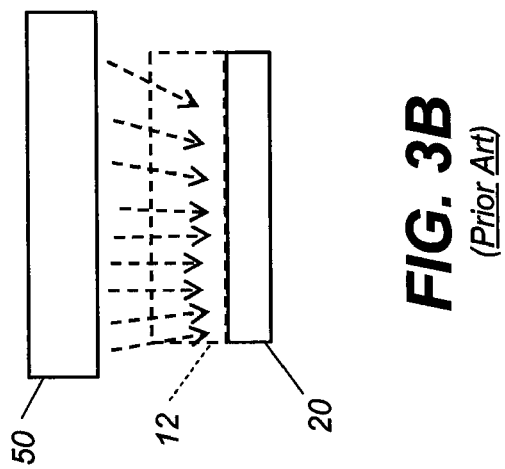
Figure 3A:
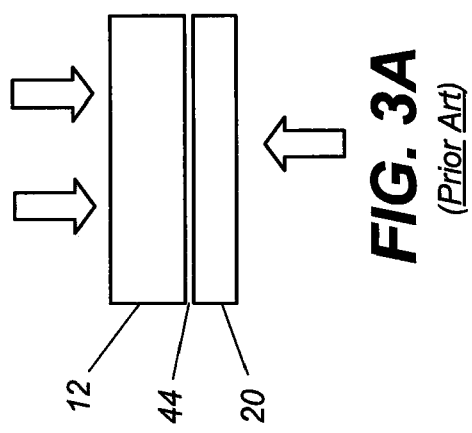
Figure 3E:
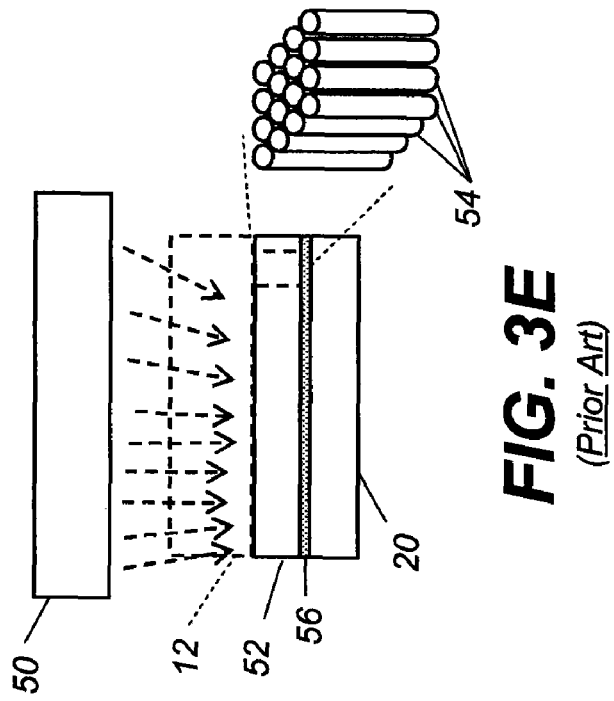
Figure 3D:
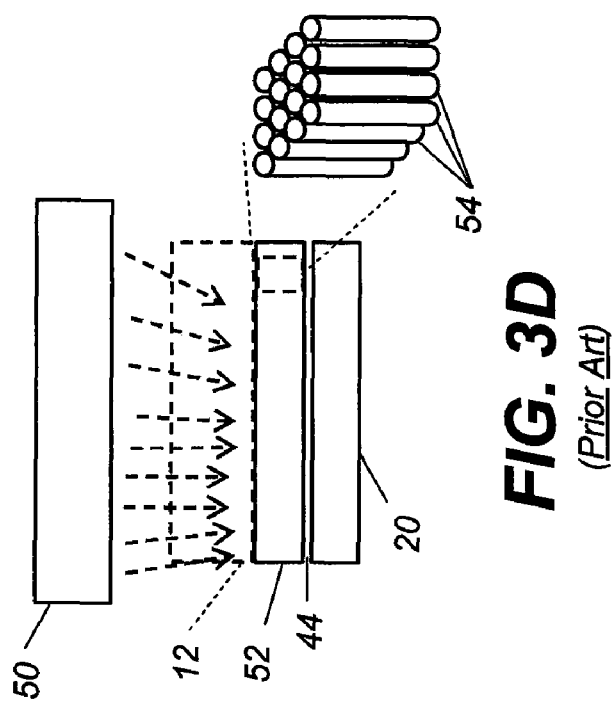
Figure 3F:
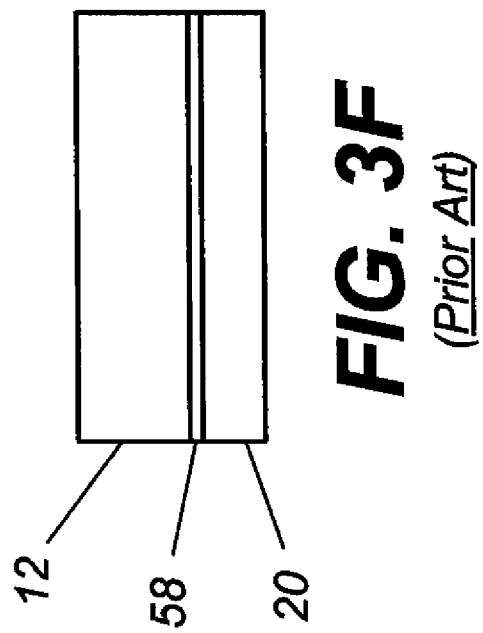
Figure 4:
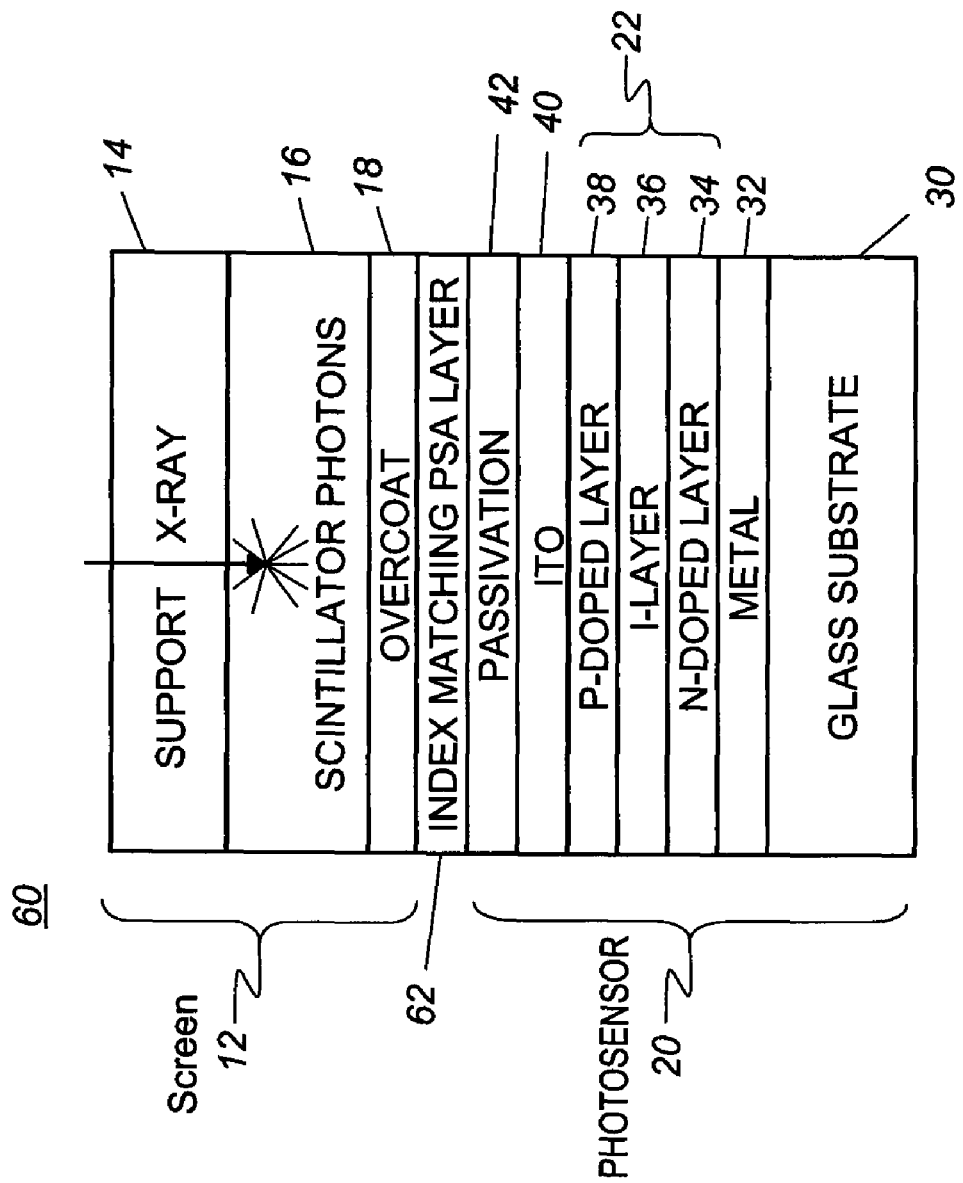
FIG. 4 is a cross-sectional view showing a DR panel with pressure-sensitive adhesive bonding according to one embodiment.

In Eq. (1), $A_{pd}$ is the absorption by the intrinsic layer (I-layer 36) of photosensor 22 (FIGS. 4, 5B). $A_j$ is the absorption by the $j^{th}$ layer:

$$A_j = 1 - e^{-\alpha_j t_j} \quad (2)$$

where $\alpha_j$ and $t_j$ are the absorption coefficient and the thickness of the $j^{th}$ layer, respectively and values $R_{TIR,k}$ and $R_{Fresnel,k}$ are the total internal reflection and Fresnel reflection of the $k^{th}$ interface, respectively.

Assuming that the light has a Lambertian distribution, $R_{TIR,k}$ is given by $$R_{TIR,k} = 1 - \sin^2 \theta_c \quad (3)$$

where $\theta_c$ is the critical angle for light entering a rare medium with refractive index n' from a dense medium with refractive index n, $$\theta_c = \sin^{-1}\left(\frac{n'}{n}\right) \quad (4)$$

For unpolarized light, the reflection at the $k^{th}$ interface is given by the Fresnel equation, $$R_{Fresnel,k} = \frac{1}{2}\left[\frac{\sin^2(i-r)}{\sin^2(i+r)} + \frac{\tan^2(i-r)}{\tan^2(i+r)}\right] \quad (5)$$

where i and r are the angles of incidence and refraction, respectively. Angles i and r are related by Snell's law, $$n_i \sin i = n_r \sin r \quad (6)$$

where $n_i$ and $n_r$ are the refractive indices of the two media forming the interface.

In general, scintillator layer 16 is a porous medium made of several components. For example, a $Gd_2O_2S$:Tb layer consists of about 55% (in volume) of $Gd_2O_2S$ powder phosphor, 17% (in volume) of PVA binder, and 28% (in volume) of air. On the other hand, a typical CsI:Tl layer consists of about 75% (in volume) of columnar CsI phosphor and 25% (in volume) of air. The effective refractive index of an m-component medium can be obtained by using the Bruggeman equation:

$$\sum_1^m f_i\left(\frac{n_i^2 - n^2}{n_i^2 + 2n^2}\right) = 0 \quad (7)$$

where $f_i$ and $n_i$ are the volume fraction and the refractive index of the $i^{th}$ component, respectively. Given the refractive indices of pure $Gd_2O_2S$ and CsI, 2.2 and 1.78 at the wavelength of 0.55 um (at which the emission of light from the scintillator upon x-ray irradiation has the maximum intensity for both $Gd_2O_2S$ and CsI), respectively, the effective refractive indices of the above typical $Gd_2O_2S$ and CsI layers are 1.73 and 1.58, respectively.

Figure 6:
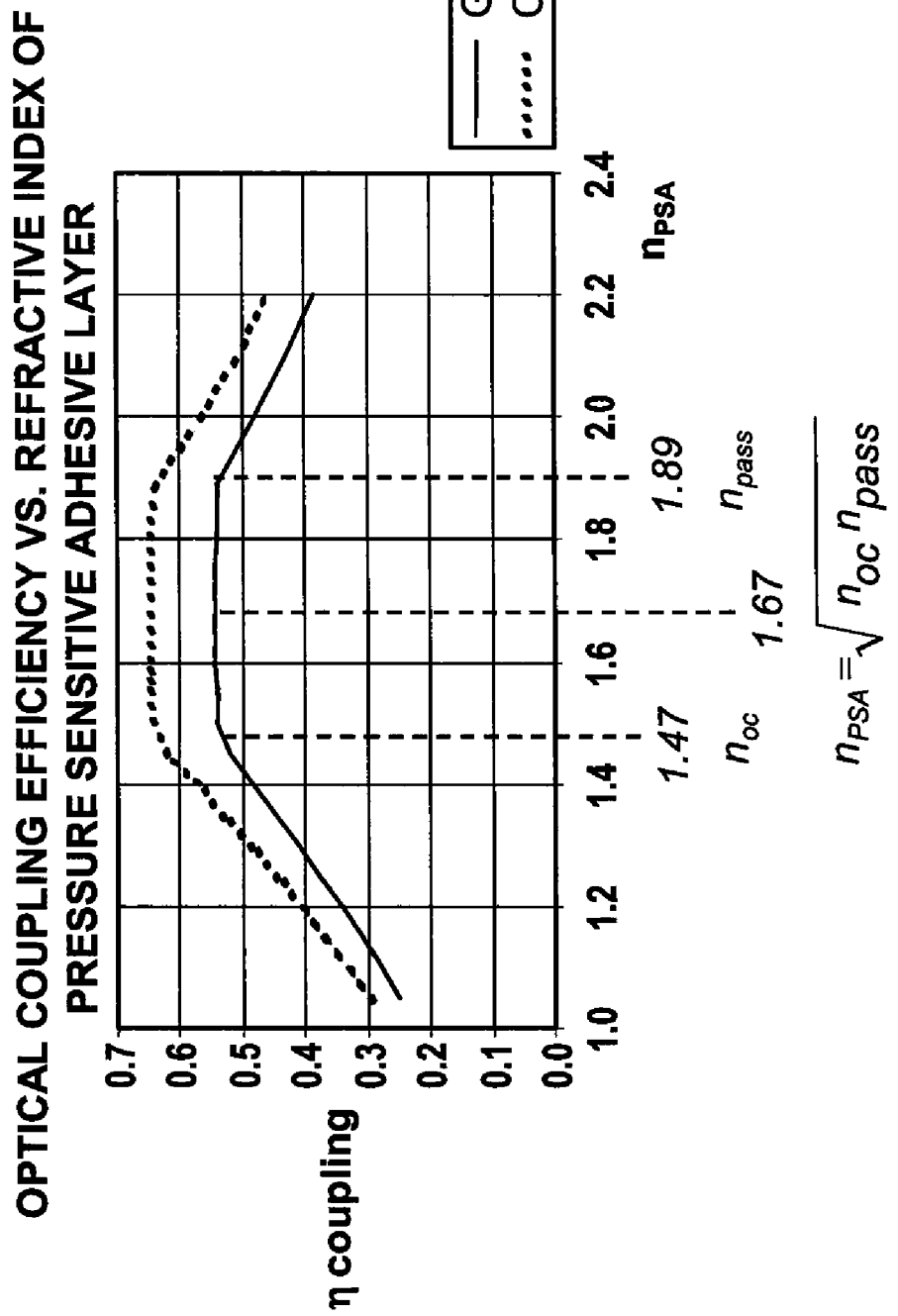
FIG. 6 is a graph showing optical coupling efficiency for different indices of refraction of the pressure-sensitive adhesive layer.

As an example, consider scintillator screen 12 having an overcoat layer 18 (70 wt. % PMMA+30 wt. % PVDF) with a refractive index of 1.47 at the wavelength of 0.55 um, coupled to detector 20 having passivation layer 42 ($SiO_xN_y$) with a refractive index of 1.89 at the wavelength of 0.55 um. The coupling is achieved using a PSA layer with a refractive index $n_{PSA}$. The dependence of optical coupling efficiency on the refractive index of the PSA layer for both $Gd_2O_2S$ and CsI screens is shown in FIG. 6. The optical coupling efficiency initially increases with increasing $n_{PSA}$ before reaching a plateau, then decreases with further increase in $n_{PSA}$.

Preferably, maximum optical coupling efficiency occurs when the refractive index of the PSA, $n_{PSA}$ satisfies:

$$n_{PSA} = \sqrt{n_{oc} n_{pass}}, \quad (8)$$

where $n_{oc}$ and $n_{pass}$ are the refractive index of the overcoat and the passivation layers, respectively. For the example shown in FIG. 6, the condition of Eq. (8) is met with a value $n_{PSA}$ of 1.67. Below a value $n_{PSA}$ of 1.47 (equal to the value of $n_{oc}$), efficiency drops off steadily. For example, with value $n_{PSA}$ at 1.44, efficiency drops by about 5%. With value $n_{PSA}$ at 1.40, efficiency drops by about 10%. With value $n_{PSA}$ at 1.37, efficiency drops by about 15%. The same general behavior occurs, with incrementally decreasing efficiency, as value $n_{PSA}$ exceeds 1.89, the value of $n_{pass}$ in this example.

In practice, it can be very difficult to obtain the perfect match that satisfies Eq. (8). A substantially matching index value, as defined earlier, can approximate Eq. (8) and provide optical coupling efficiency within a sufficiently high range for most applications.

This broader condition in relation (9) is met in most cases with the PSA, passivation, and overcoat materials when the index of refraction $n_{PSA}$ lies in the range between $n_{oc}$ and $n_{pass}$ so that it satisfies:

$$n_{oc} \leq n_{PSA} \leq n_{pass} \text{ if } n_{oc} < n_{pass} \quad (9)$$

or $$n_{oc} \geq n_{PSA} \geq n_{pass} \text{ if } n_{oc} > n_{pass} \quad (10)$$

The first case where $n_{oc} < n_{pass}$ is generally a preferred case, since it is not in itself susceptible to TIR for the intended light direction. If $n_{PSA}$ does not lie in the range between $n_{oc}$ and $n_{pass}$, it is most advantageous to have either of absolute values $|(n_{oc} - n_{PSA})|$ or $|(n_{PSA} - n_{pass})|$ as small as possible.

In practice, as shown in FIG. 6, when using a PSA material having a refractive index in the range of 1.44-1.93, the optical coupling efficiency is within about 95% of the maximum value of 54.3% and 64.7% for the $Gd_2O_2S$ and CsI screens, respectively. Most PSAs are organic polymers having a refractive index of less than 1.70. The selection of a PSA with a refractive index in the range from about 1.44-1.56 at the wavelength of 0.55 um provides optical coupling efficiency within the highest range for this example.

Suitable PSA Materials

There are a number of PSAs that are substantially transparent. Examples of optically clear PSAs include the following.

Optically clear adhesives 8141 and 8142 manufactured by 3M™, St. Paul, Minn. These PSAs have a thickness of 25.4 um and 50.8 um, a refractive index of 1.4742 and 1.4749 at 633 nm, and a haze level of 0.1% and 0.3%, respectively. They have a light transmission greater than 99% over the visible spectrum and a peel adhesion strength greater than 24 N/100 mm. There are many sizes for these PSAs up to 48" web.

Gel-Film PF-40/1.5-X0 by Gel-Pak™ Hayward, Calif. is made from cross-linked polymer material. The material adheres to a surface on contact based on surface tension. These adhesives are transparent and come with different sizes and thickness. Typical refractive index is in the range of 1.46 and 1.60.

ARclear™ 8154 and 8932 optically clear PSAs by Adhesives Research, Inc., Glen Rock, Pa. have a thickness of 25.4 um and 50.8 um, and a refractive index of 1.47 and 1.41, respectively. Both adhesives have a visible light transmission of more than 98%.

Other typical PSAs can be formulated with one or more monomer containing a substituted (or an un-substituted) aromatic moiety (U.S. Pat. No. 6,663,978 B1) to provide a thickness as thin as 12.7 um, a refractive index of 1.48-1.56, a light transmission of greater than 92%, and a good adhesion strength.

EXAMPLES

As described earlier, the optical coupling efficiency depends on the optical properties of each layer for both the scintillator screen and the detector array. Using typical optical parameters for each component in a flat-panel detector, the optical coupling efficiency for various designs are calculated and shown in Tables 1 and 2 for systems using $Gd_2O_2S$ and CsI screens, respectively.

These examples show various combinations of phosphor materials, the overcoat layers, the PSA layer, and the passivation layer of the detector array. Results shown in Tables 1 and 2 can be summarized as follows.

(a) If there is an air gap between the scintillator screen and the detector array, the optical coupling efficiency would be reduced by about 60% (Examples 2 and 8 in Table 1, and Examples 12 and 18 in Table 2).

(b) With the use of an index matching PSA layer, the optical coupling efficiency would only decrease by about 2% (Examples 3, 4, 5, and 7 in Table 1, and Examples 13, 14, 15, and 17 in Table 2).

(c) The use of an overcoat layer with a higher refractive index [e.g., polyethylene terephthalate (PET)] would improve the optical coupling efficiency by about 11% for the $Gd_2O_2S$ screen (Example 6 in Table 1).

(d) The use of an index matching PSA layer to couple the scintillator screen without an overcoat layer to a detector array would improve the optical coupling efficiency by about 10% (Example 9 in Table 1 and Example 19 in Table 2).

(e) Using a passivation layer with a lower refractive index [e.g., benzocyclobutene (BCB)], would yield negligible change in optical coupling efficiency (Example 7 in Table 1 and Example 17 in Table 2). BCB is a planarizing material which is a material that forms a smooth planar surface upon application, instead of forming a surface that reflects irregular contours of the underlying surface. Preferred planarizing materials include polymers, such as fluorinated polymers, parylenes, cyclotenes and polyacrylates and combinations thereof.

(f) If the phosphor layer is directly coated on the detector array without the overcoat layer, the optical coupling efficiency would increase by about 40% and 16% for the $Gd_2O_2S$ and CsI phosphor screens, respectively (Example 10 in Table 1 and Example 20 in Table 2).

(g) Example 5 of Table 1 shows a match in which $n_{PSA} = \sqrt{n_{oc} n_{pass}}$, as noted earlier in Eq. (8). There is some light absorption by the PSA, which slightly reduces the optical coupling efficiency.

TABLE 1

Optical Coupling Efficiency of Various DR Systems Using a $Gd_2O_2S$ Screen

| Example | Layer structure | Layer material | Refractive index of layer | Optical coupling efficiency (%) | Coupling efficiency relative to Example 1 (%) | Remark |
|---|---|---|---|---|---|---|
| 1 | Scintillator | $Gd_2O_2S$* | 1.73 | 55.0 | 100.0 | Perfect contact between scintillator screen and photodiode array |
|  | Overcoat | PMMA + PVDF** | 1.47 |  |  |  |
|  | Passivation | SiOxNy | 1.89 |  |  |  |
| 2 | Scintillator | $Gd_2O_2S$ | 1.73 | 22.4 | 40.7 | With an air gap |
|  | Overcoat | PMMA + PVDF | 1.47 |  |  |  |
|  | Air gap | Air | 1.00 |  |  |  |
|  | Passivation | SiOxNy | 1.89 |  |  |  |
| 3 | Scintillator | $Gd_2O_2S$ | 1.73 | 54.2 | 98.5 | With a PSA layer |
|  | Overcoat | PMMA + PVDF | 1.47 |  |  |  |
|  | PSA |  | 1.56 |  |  |  |
|  | Passivation | SiOxNy | 1.89 |  |  |  |
| 4 | Scintillator | $Gd_2O_2S$ | 1.73 | 53.9 | 98.0 | With a different PSA layer |
|  | Overcoat | PMMA + PVDF | 1.47 |  |  |  |
|  | PSA |  | 1.48 |  |  |  |
|  | Passivation | SiOxNy | 1.89 |  |  |  |
| 5 | Scintillator | $Gd_2O_2S$ | 1.73 | 54.3 | 98.7 | With an index matching PSA layer |
|  | Overcoat | PET | 1.47 |  |  |  |
|  | PSA |  | 1.67 |  |  |  |
|  | Passivation | SiOxNy | 1.89 |  |  |  |
| 6 | Scintillator | $Gd_2O_2S$ | 1.73 | 61.0 | 110.9 | With a different overcoat |
|  | Overcoat | PET | 1.65 |  |  |  |
|  | PSA |  | 1.56 |  |  |  |
|  | Passivation | SiOxNy | 1.89 |  |  |  |

TABLE 1-continued

Optical Coupling Efficiency of Various DR Systems Using a Gd$_2$O$_2$S Screen

| Example | Layer structure | Layer material | Refractive index of layer | Optical coupling efficiency (%) | Coupling efficiency relative to Example 1 (%) | Remark |
|---|---|---|---|---|---|---|
| 7 | Scintillator | Gd$_2$O$_2$S | 1.73 | 54.7 | 99.5 | With a different passivation layer |
|   | Overcoat | PET | 1.47 | | | |
|   | PSA | | 1.56 | | | |
|   | Passivation | BCB | 1.56 | | | |
| 8 | Scintillator | Gd$_2$O$_2$S | 1.73 | 21.8 | 39.6 | No overcoat, with an air gap |
|   | Air gap | Air | 1.00 | | | |
|   | Passivation | SiO$x$N$y$ | 1.89 | | | |
| 9 | Scintillator | Gd$_2$O$_2$S | 1.73 | 60.9 | 110.7 | No overcoat, with a PSA layer |
|   | PSA | | 1.56 | | | |
|   | Passivation | SiO$x$N$y$ | 1.89 | | | |
| 10 | Scintillator | Gd$_2$O$_2$S | 1.73 | 77.2 | 140.4 | No overcoat, direct deposition of phosphor |
|    | Passivation | SiO$x$N$y$ | 1.89 | | | |

*Phosphor packing fraction = 55%, binder volume fraction = 17%, porosity = 28%
**Overcoat: 70 wt. % PMMA + 30 wt. % PVDF
PMMA: Polymethyl methacrylate
PVDF: Poly(vinylidene fluoride)
PET: Polyethylene terephthalate
BCB: Benzocyclobutene

TABLE 2

Optical Coupling Efficiency of Various DR Systems Using a CsI Screen

| Example | Layer structure | Layer material | Refractive index of layer | Optical coupling efficiency (%) | Coupling efficiency relative to Example 11 (%) | Remark |
|---|---|---|---|---|---|---|
| 11 | Scintillator | CsI* | 1.58 | 65.5 | 100.0 | Perfect contact between scintillator screen and photodiode array |
|    | Overcoat | PMMA + PVDF** | 1.47 | | | |
|    | Passivation | SiO$x$N$y$ | 1.89 | | | |
| 12 | Scintillator | CsI | 1.58 | 26.7 | 40.8 | With an air gap |
|    | Overcoat | PMMA + PVDF | 1.47 | | | |
|    | Air gap | Air | 1.00 | | | |
|    | Passivation | SiO$x$N$y$ | 1.89 | | | |
| 13 | Scintillator | CsI | 1.58 | 64.5 | 98.5 | With a PSA layer |
|    | Overcoat | PMMA + PVDF | 1.47 | | | |
|    | PSA | | 1.56 | | | |
|    | Passivation | SiO$x$N$y$ | 1.89 | | | |
| 14 | Scintillator | CsI | 1.58 | 64.2 | 98.0 | With a different PSA layer |
|    | Overcoat | PMMA + PVDF | 1.47 | | | |
|    | PSA | | 1.48 | | | |
|    | Passivation | SiO$x$N$y$ | 1.89 | | | |
| 15 | Scintillator | CsI | 1.58 | 64.7 | 98.8 | With an index matching PSA layer |
|    | Overcoat | PET | 1.47 | | | |
|    | PSA | | 1.67 | | | |
|    | Passivation | SiO$x$N$y$ | 1.89 | | | |
| 16 | Scintillator | CsI | 1.58 | 66.1 | 100.9 | With a different overcoat |
|    | Overcoat | PET | 1.65 | | | |
|    | PSA | | 1.56 | | | |
|    | Passivation | SiO$x$N$y$ | 1.89 | | | |
| 17 | Scintillator | CsI | 1.58 | 65.1 | 99.4 | With a different passivation layer |
|    | Overcoat | PET | 1.47 | | | |
|    | PSA | | 1.56 | | | |
|    | Passivation | BCB | 1.56 | | | |
| 18 | Scintillator | CsI | 1.58 | 26.4 | 40.3 | No overcoat, with an air gap |
|    | Air gap | Air | 1.00 | | | |
|    | Passivation | SiO$x$N$y$ | 1.89 | | | |
| 19 | Scintillator | CsI | 1.58 | 72.3 | 110.4 | No overcoat, with a PSA layer |
|    | PSA | | 1.56 | | | |
|    | Passivation | SiO$x$N$y$ | 1.89 | | | |
| 20 | Scintillator | CsI | 1.58 | 75.8 | 115.7 | No overcoat, direct deposition of phosphor |
|    | Passivation | SiO$x$N$y$ | 1.89 | | | |

*Phosphor packing fraction = 75%, porosity = 25%
**Overcoat: 70 wt. % PMMA + 30 wt. % PVDF
PMMA: Polymethyl methacrylate
PVDF: Poly(vinylidene fluoride)
PET: Polyethylene terephthalate
BCB: Benzocyclobutene Fabrication Methods In general, commercial PSAs are packaged in a sheet or rolled sheet form in which the PSA layer is sandwiched between two release layers. To bond the scintillator screen to the detector array, the following steps can be used:
1. Peel off one of the release layers from the PSA.
2. Attach the exposed adhesive to the overcoat of the scintillator screen.
3. Peel off the remaining release layer.
4. Attach the scintillator screen having the adhesive layer to the photodiode array.
5. Feed the combined structure through a pair of rotating heated rollers having a predetermined spacing. The heated rollers soften the adhesive and prevent air bubbles from becoming established between the PSA layer and its adjacent layers.

This 5-step process provides a bonded structure with very good optical contact between scintillator and detector components. Alternately, a web-based fabrication scheme may be used, as shown schematically in FIG. 7. In a web fabrication apparatus 70, a flexible scintillator screen 72 contains a phosphor layer coated onto a flexible substrate, with an overcoat layer coated onto the phosphor layer. A flexible photodetector array 74 has a photodiode/thin film transistor (TFT) array, and a protective passivation layer formed on a flexible substrate. A PSA layer 80 is provided without release layers. Flexible scintillator screen 72, flexible photodetector array 74, and PSA layer 80 are fed into the nip between rollers 76 and 78. Typically, rollers 76 and 78 apply both heat and pressure, with predetermined nip spacing, to effect a bond of PSA layer 80 to both flexible scintillator screen 72 and flexible photodetector array 74. Heated rollers 76 and 78 soften the adhesive and prevent air bubbles between the adhesive layer and its adjacent layers. This process provides a flexible DR panel 82 as a bonded structure with very good contact between scintillator and detector components.

The term "flexible" refers generally to sheet materials that are thinner than about 1 mm and that exhibit a flexural modulus of elasticity E similar to that of plastic, which typically ranges between about 100,000-500,000 psi.

Figure 7:
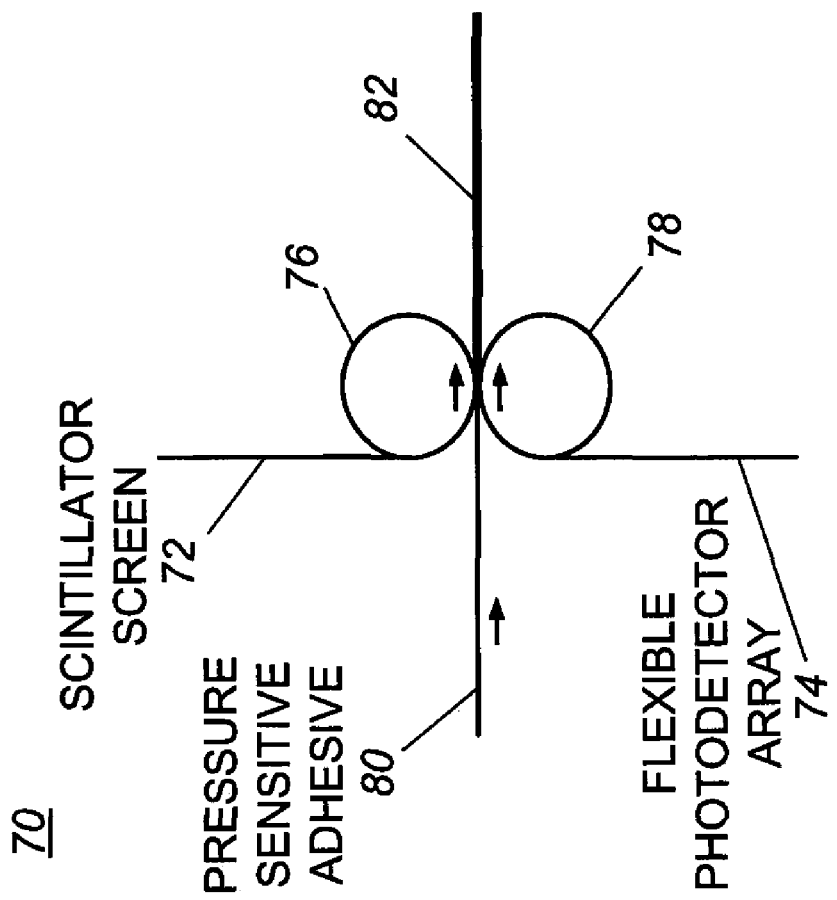
FIG. 7 is a schematic diagram showing a web-based manufacturing method for a flexible DR panel in one embodiment.

The web-based technique of FIG. 7 could alternately be adapted for embodiments in which one or the other of the scintillator or detector array is a rigid material. It can be appreciated, however, that this arrangement is particularly useful for forming a flexible DR receiver.

In another embodiment, DR panel fabrication may employ only a single roller, heated or unheated, preferably having a length dimension (parallel to its axis) that exceeds the width (dimension parallel to the roller length) of the assembled DR panel. Pressure is applied as the roller moves over the surface of the combined scintillator sheet, pressure-sensitive adhesive, and detector array.

If a hydroscopic CsI:Tl columnar phosphor is used as the scintillator, a getter material (such as a desiccant) can be provided within the adhesive layer to remove the water vapor (moisture) and other harmful species from the surrounding atmosphere, thus protecting the scintillator material itself. A desiccant (e.g., calcium chloride) reacts with the active water vapor forming stable low-vapor-pressure chemical compound, thereby removing active water vapor from the gas phase.

Use of index-matched pressure sensitive adhesives for bonding the scintillator screen to the detector array offers a number of desirable properties. The resulting DR panel can be relatively thin where scintillator and detector materials are so constituted. Uniform thickness of the panel can be achieved. PSAs exhibit good adhesion strength, so that separation of components with ageing is unlikely. PSAs offer substantial flexibility and are compatible with plastic and other flexible substrate surfaces. PSAs can be formulated without chemical components that might otherwise harm the scintillator or photosensor materials. PSAs are relatively inexpensive and generally easy to handle and apply. When PSAs are properly applied, the absence of microscopic air gaps or pockets of air between the scintillator screen and the detector array helps to improve optical coupling efficiency. With the index-matched PSA, light spreading within the PSA layer and resulting losses in spatial resolution (as measured by MTF) are minimized.

In one embodiment, a releasable PSA is used for bonding. To be releasable, the PSA material would have a peel strength that is nominally in the range from about 7 N/100 mm to about 16 N/100 mm. Here, the scintillator screen is thus not permanently bonded to the detector array. Instead, the scintillator screen can be peeled off from the detector array, allowing an alternate scintillator screen to be attached to the same photosensor circuitry, without damage to either the scintillator screen or the photosensor array. This would allow use of an alternate material having imaging characteristics suitable to the type of image being obtained. For example, specialized fluoroscopy and mammography scintillator screens, preferred for specialized applications, could be substituted for each other with a PSA that allows release in this way.

Conventional epoxy resins or other adhesives are typically applied in liquid form requiring a subsequent curing treatment. They are not pressure sensitive and tend to harden or become brittle, rendering these materials particularly undesirable for use in flexible DR detectors having a flexible substrate. By comparison, no curing step such as exposure to ultraviolet light or application of high temperatures is needed to cure the PSAs. Moreover, PSAs are flexible and are thus well-suited for use in flexible DR detectors. These flexible DR detectors are particularly advantageous for some imaging applications such as intra-oral, intensive care unit (ICU) imaging, and non-destructive testing (NDT) imaging.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, the scintillator screen may have any number of materials provided on its light-emitting surface. Similarly, the photodetector array may be coated with any of a number of protective materials at the PSA interface.

Thus, what is provided is an apparatus and method for improved optical coupling between scintillator and light receptor components.

PARTS LIST

10. Indirect digital radiography panel
12. Scintillator screen
14. Support
16. Scintillator layer
18. Overcoat layer
20. Flat-panel detector
22. Photosensor
24. Pixel
25. Readout elements
26. Switch element
30. Substrate
32. Metal
34. N-doped layer 36. I-layer (intrinsic or undoped layer)
38. P-doped layer
40. ITO layer
42. Passivation layer
44. Air gap
50. Deposition apparatus
52. Fiber-optic plate
54. Optical fiber
56. Optical adhesive
58. Polymer layer
60. DR panel
62. Pressure-sensitive adhesive (PSA) layer
64. Light-exiting surface of screen 12
66. Light-accepting surface of detector 20
70. Web fabrication apparatus
72. Flexible scintillator screen
74. Flexible photodetector array
76. Roller
78. Roller
80. PSA layer
82. Flexible DR panel
A, B, C, D. Arrow
E. Enlarged section

The invention claimed is:

1. A digital radiography panel comprising:
    a scintillator screen having a light-exiting surface from a material with a first index of refraction $n_1$;
    a photosensor array having a light-accepting surface from a material with a second index of refraction $n_2$; and
    a dry form pressure-sensitive adhesive to adhere to opposing dissimilar surfaces without further activation to bond the light-exiting layer of the scintillator screen to the light-accepting layer of the photosensor array and having a third index of refraction that has a value $n_{PSA}$ that either lies in the range between $n_1$ and $n_2$, or substantially matches $n_1$ or $n_2$, or both.

2. The digital radiography panel of claim 1 wherein index of refraction $n_{PSA}$ further substantially meets the following condition:

$$n_{PSA} = \sqrt{n_1 n_2}.$$

3. The digital radiography panel of claim 1 wherein index of refraction $n_{PSA}$ further meets the following condition:

$$|(n_1 - n_{PSA})| \leq 0.12 \text{ or } |(n_{PSA} - n_2)| \leq 0.12.$$

4. The digital radiography panel of claim 1 wherein index of refraction $n_{PSA}$ further meets the following condition:

$$|(n_1 - n_{PSA})| \leq 0.08 \text{ or } |(n_{PSA} - n_2)| \leq 0.08.$$

5. The digital radiography panel of claim 1 wherein index of refraction $n_{PSA}$ further meets the following condition:

$$|(n_1 - n_{PSA})| \leq 0.04 \text{ or } |(n_{PSA} - n_2)| \leq 0.04.$$

6. The digital radiography panel of claim 1 wherein the light-exiting surface is on a coating deposited over a scintillator material.

7. The digital radiography panel of claim 1 wherein the pressure-sensitive adhesive comprises a cross-linked polymer.

8. The digital radiography panel of claim 1 wherein the pressure-sensitive adhesive is releasable.

9. The digital radiography panel of claim 8 wherein the scintillator screen is a first scintillator screen, wherein the releasable dry-form pressure-sensitive adhesive is configured to replace the first scintillator screen from the releasable dry-form pressure-sensitive adhesive by removing the first scintillator screen to apply a second scintillator screen onto the releasable dry-form pressure-sensitive adhesive, wherein the second scintillator screen is for a different type of radiographic image than the first scintillator screen.

10. The digital radiography panel of claim 1 wherein the light-accepting surface is on a passivation layer.

11. The digital radiography panel of claim 1 wherein the scintillator screen is formed on a flexible substrate.

12. The digital radiography panel of claim 1, wherein the scintillator screen has an index of refraction $n_0$, a protective layer coupled to the scintillator screen having the light-exiting surface from the material with the first index of refraction $n_1$, wherein the index of refractions satisfy $n_0$ is less than $n_1$, $n_1$ is less than $n_{PSA}$, $n_{PSA}$ is less than $n_2$.

13. The digital radiography panel of claim 12 wherein index of refraction $n_{PSA}$ further substantially meets the following condition:

$$n_{PSA} = \sqrt{n_1 n_2}.$$

14. A method of fabricating a digital radiography panel, comprising:
    providing a scintillator screen having a light-exiting surface from a material with a first index of refraction $n_1$;
    providing a photosensor array having a light-accepting surface from a material with a second index of refraction $n_2$; and
    applying a pressure-sensitive adhesive between the light-exiting surface and the light-accepting surface, wherein the scintillator screen is a first material scintillator screen including characterisitics for a first type of radiographic image and further comprising
    peeling the first material scintillator screen from the pressure-sensitive adhesive to remove the first material scintillator screen; and
    applying a second material scintillator screen onto the pressure-sensitive adhesive, wherein the second material scintillator screen includes characterisitics for a second different type of radiographic image than the first material scintillator screen.

15. The method of claim 14 wherein applying the pressure-sensitive adhesive comprises:
    peeling off one or more release layers from the pressure-sensitive adhesive for bonding the screen to the array; and
    pressing and rolling a roller over the combined screen, pressure-sensitive adhesive and array.

16. The method of claim 14 wherein applying the pressure-sensitive adhesive comprises:
    peeling off one or more release layers from the pressure-sensitive adhesive for bonding the screen to the array; and
    feeding the combined screen, pressure-sensitive adhesive, and array between heated rollers.

17. The method of claim 14 wherein the scintillator screen has an index of refraction $n_1$, a protective layer coupled to the scintillator screen includes the light-exiting surface from the material with the first index of refraction $n_1$, the pressure sensitive adhesive has an index of refraction $n_{PSA}$, wherein the index of refractions satisfy $n_0$ is less than $n_1$, $n_1$ is less than $n_{PSA}$, $n_{PSA}$ is less than $n_2$.

18. A method of fabricating a digital radiography panel, comprising steps of:

providing a scintillator screen having a light-exiting surface from a material with a first index of refraction $n_1$;

providing a photosensor array having a light-accepting surface from a material with a second index of refraction $n_2$; and applying a dry-form sheet pressure-sensitive adhesive between the light-exiting surface and the light-accepting surface after respectively removing a first release layer and a second release layer from opposite sides of the dry-form sheet pressure-sensitive adhesive.

19. The method of claim 18 wherein applying the dry-form sheet pressure-sensitive adhesive comprises:

peeling off one or more release layers from the pressure-sensitive adhesive for bonding the screen to the array; and pressing and rolling a roller over the combined screen, pressure-sensitive adhesive and array.

20. The method of claim 18 wherein index of refraction $n_{PSA}$ of the dry-form sheet pressure-sensitive adhesive substantially meets the following condition:

$$n_{PSA} = \sqrt{n_1 n_2}.$$

21. The method of claim 18 wherein the screen is a first screen and further comprising peeling the first screen to remove it from the pressure-sensitive adhesive; and applying a second scintillator screen onto the pressure-sensitive adhesive, wherein the second scintillator screen is different from the first scintillator screen and includes characterisitics for a second different type of radiographic image than the first scintillator screen.

22. The method of claim 18 wherein the dry-form sheet pressure sensitive adhesive does not receive additional activation or curing.

* * * * *